United States Patent [19]

Dedole et al.

[11] Patent Number: 4,682,309

[45] Date of Patent: Jul. 21, 1987

[54] DEVICE FOR GENERATING ACOUSTIC PULSES BY IMPLOSION, INSIDE A WELL

[75] Inventors: Pascal Dedole, Rueil Malmaison; Jean Laurent, Morainvilliers, both of France

[73] Assignee: Institut Francais du Petrole, Rueil-Malmaison, France

[21] Appl. No.: 675,854

[22] Filed: Nov. 28, 1984

[30] Foreign Application Priority Data

Nov. 29, 1983 [FR] France ................................ 83 19185

[51] Int. Cl.$^4$ .......................... G01V 1/38; G01V 1/14
[52] U.S. Cl. ..................................... 367/146; 181/120
[58] Field of Search ....................... 181/113, 118, 120; 367/144, 146

[56] References Cited

U.S. PATENT DOCUMENTS 4,253,539 3/1981 Magneville .......................... 181/120
4,303,141 12/1981 Pascouet ............................. 367/146

FOREIGN PATENT DOCUMENTS 146448 6/1985 European Pat. Off. ............ 367/146

Primary Examiner—Deborah L. Kyle
Assistant Examiner—Ted L. Parr
Attorney, Agent, or Firm—Antonelli, Terry & Wands

[57] ABSTRACT

A device for generating acoustic pulses by driving suddenly into a body lowered in a well a piston having a face in contact with the liquid contained in the well and adapted for sliding inside said body. The device comprises a valve securely fixed to the piston, a second piston and a hydraulic system disposed completely in the body and comprising principally a pump, electrovalves, an equalizing cylinder, a low pressure reservoir and supply circuits, for moving the valve and the piston to a set position and for immobilizing it intermittently.

7 Claims, 5 Drawing Figures

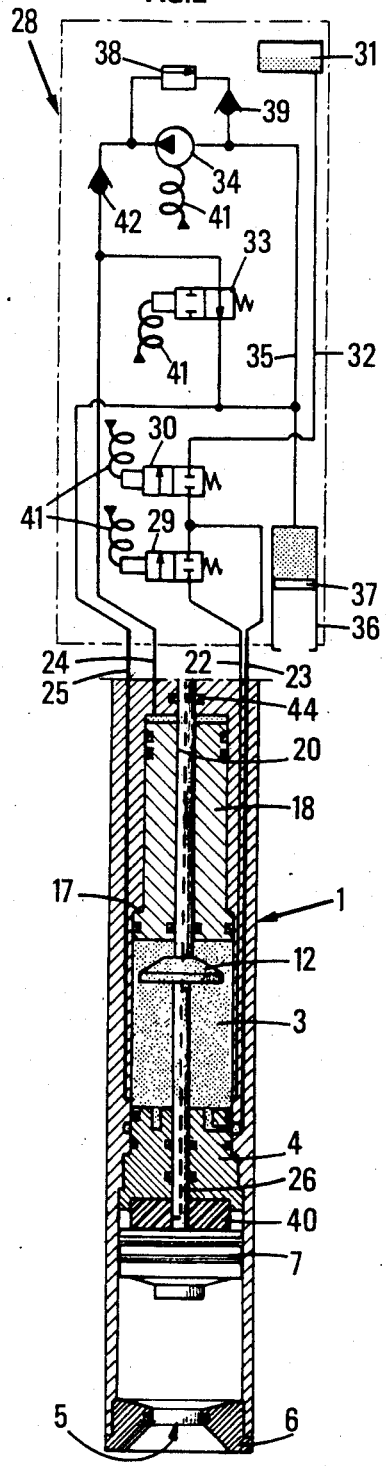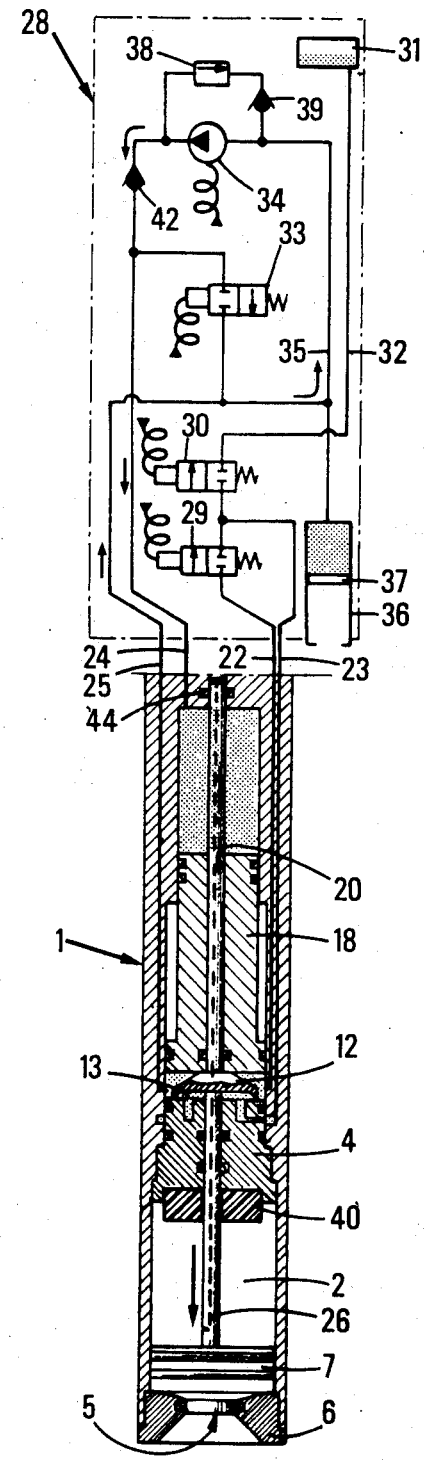

DEVICE FOR GENERATING ACOUSTIC PULSES BY IMPLOSION, INSIDE A WELL

BACKGROUND OF THE INVENTION

The present invention relates to a device for generating acoustic pulses by implosion inside a well or a cavity, and, more particularly, to an emission device adapted to be lowered to a certain depth in a well drilled in the ground, for generating acoustic pulses which may be used for carrying out, for example, seismic prospection.

A seismic source for wells has a number of advantages as compared with a source disposed on the surface. An appreciable part of the acoustic energy produced by a surface source is in fact emitted in the form of surface waves or RAYLEIGH waves which cannot be used and the part of this energy which is emitted in the form of P or S type waves is considerably attenuated by the surface layer weathered zone.

The P or S wave energy yield of a well source emitting under the surface layer is therefore much larger.

Among well sources of a known type, there may be mentioned those using solid explosives or explosive gas mixtures. Such sources produce very powerful seismic pulses but use thereof at a great depth is difficult because the duration of their operating cycle is fairly long. It should also be noted that the frequency spectrum of these pulses comprises a considerable part of high frequencies which have no interest in the field of seismic prospection. In addition, the power of the explosions generally results in damaging the well or impairing the neighboring regions, so that subsequency repetition of seismic firing at the same positions is difficult. Explosive sources are described for example in U.S. Pats. No. 3,408,622 and 3,858,167.

Sources of the air gun type may also be mentiioned in which the seismic pulses are generated by sudden gas discharges inside the well filled with water. Such sources produce powerful acoustic waves but require the use of a compressor or compressed fluid reservoirs which, because of the smallness of the drilled hole, must be installed on the surface and connected to the source by piping which also makes use thereof difficult and appreciably increases the duration of their operating cycle. Such a source is described for example in French Pat. No. 2,311,322.

SUMMARY OF THE INVENTION

In accordance with the invention a device for generating acoustic pulses by implosion is provided which comprises an elongate rigid body having a section less than that of the well and connected by cable to a surface installatioin, with the rigid body comprising two coaxial chambers isolated from each other by a fixed separation element. A first one of the two chambers communicates with the outside of the body at its end opposite the separation element. A first piston is adapted to tightly slide inside the first chamber between a first position towards the open end thereof and a second position, towards the opposite end, with the first piston being fast to a valve having a section greater than the section of the first piston which is exposed, in the first position thereof, to the pressure existing outside the body. The valve is adapted for movement in the second chamber and to come in abutment against a seat formed on the separation element, in the first position of the first pistion. A second piston is adapted to tightly slide inside the second chamber on the side of the valve opposite the separation element and has a stroke at least equal to that of the first piston between its first and its second positions. Means are provided for introducing a gas into the first chamber, on the side of the first piston opposite the open end, at a pressure very much lower than the external pressure, and a hydraulic operating system, comprising drive means and hydraulic circuits, is disposed inside the rigid body, for moving the first piston to its first position by the second piston pushing the valve as far as its seat and for intermittently maintaining the valve against its seat, when the second piston is brought to the end of the second chamber opposite the separation element.

The seat of the valve comprises, for example, an inner recess. The section of the opening of the first chamber is less than that of the valve and the first piston comprises a part adapted for sealingly closing this opening, when the valve comes into engagement on its seat. The second chamber is formed from two parts of unequal sections and the second piston comprises two parts of different sections respectively adapted to the sections of two parts of the second chamber, with the end of its largest section part being adapted to come into engagement on the valve. The hydraulic system comprises a pressure source, a first hydraulic circuit and a first switching means for intermittently providing an overpressure in the smallest section part of the second chamber and a second hydraulic circuit associated with the switching system for causing the recess in the seat to intermittently communicate with a reservoir whose pressure is very much lower than that existing in the second chamber when the valve is engaged on its seat. The switching means are preferably electro-valves.

The device of the invention is adapted for producing intense seismic pulses and may be reset by means of a hydraulic system contained entirely in the rigid body and connected to a surface control installatiion by electric wires incorporated in the cables supporting the device.

BRIEF DESCRIPTION OF THE DRAWINGS

Other features and advantages of the device will be clear from the following description of a preferred but non-limiting embodiment and with reference to the accompanying drawings in which:

FIG. 2 is a schematic sectional view of the device in a rest position, the hydraulic system being shown as a whole;

FIG. 3 is a schematic sectional view of the device in an intermediate position at the end of the phase for pushing the first piston to its first position (set position);

DESCRIPTION OF THE PREFERRED EMBODIMENT

Figure 1:
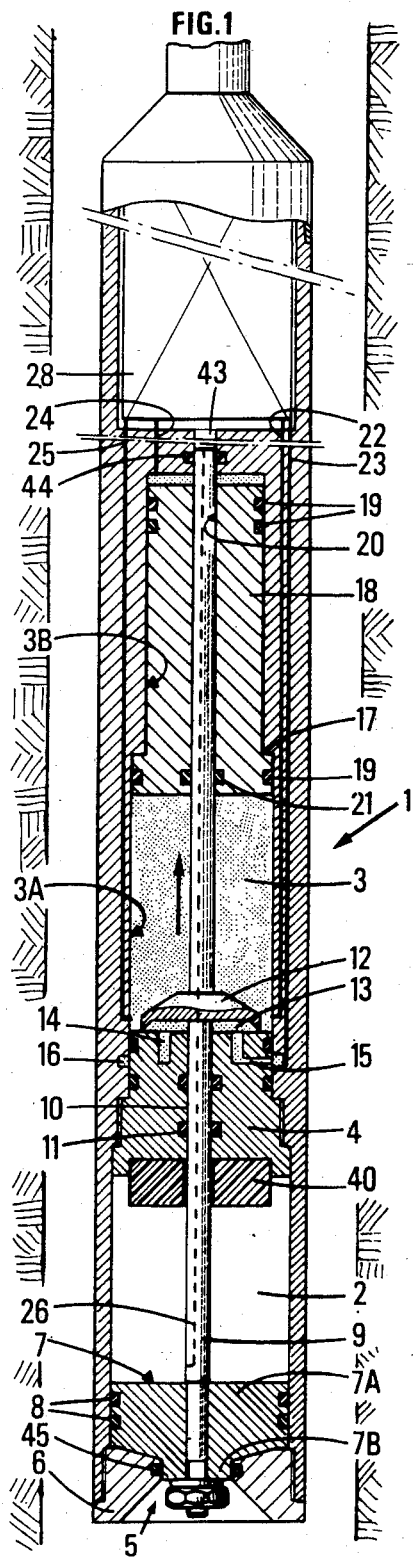
FIG. 1 is a schematic sectional view of the device ready for tripping, the hydraulic system for ensuring movement of the first piston and the maintenance of the valve being partially shown.
Figure 4:
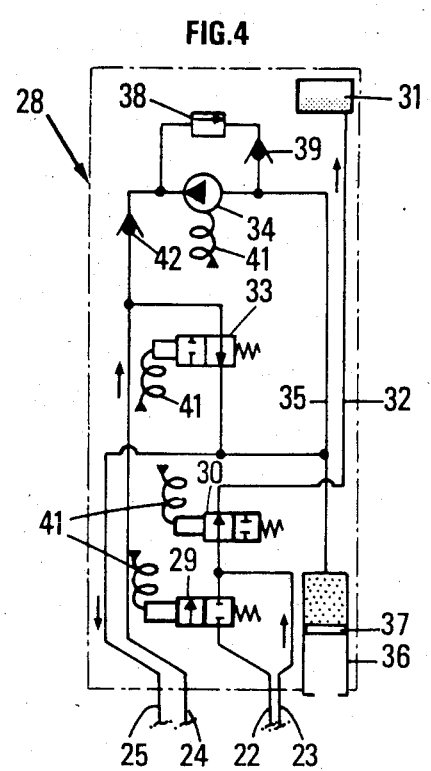
FIG. 4 is a schematic partial view of the hydraulic system controlled for causing the valve to be jammed against its seat and the second piston to rise to its rest position.
Figure 5:
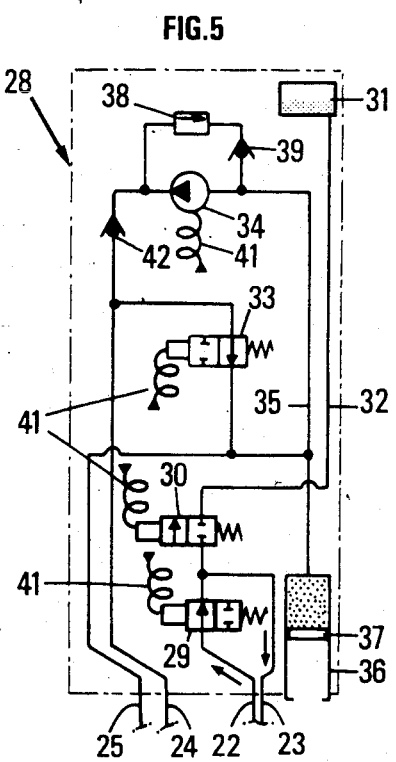
FIG. 5 is a schematic partial view of the hydraulic system controlled at the desired tripping time for releasing the valve and allowing the first piston to rise suddenly under the action of the pressure external to the body and thus creating seismic waves.

With reference to FIG. 1, it can be seen that the device comprises an elongate rigid body 1 adapted to be lowered from the surface into a drilled well, at the lower end of a handling cable (not shown) comprising electric conductors. The rigid body 1 comprises two coaxial chambers 2, 3, isolated from each other by a separation element 4, formed by a part fixed to the lateral wall of the body. The first chamber 2 communicates with the outside, at its end opposite the separation element 4, through an opening 5 formed in a plug 6 screwed into the end of the body.

The device also comprises a first piston 7 having two coaxial parts 7A, 7B whose respective sections are substantially equal to those of the first chamber 2 and the opening 5. The shape and dimensions of the two parts of piston 7 are so selected that part 7B engages in opening 5 when part 7A comes into abutment against the plug 6. Seals 8, 45 are disposed respectively about part 7A for isolating the parts of chamber 2 from each other on each side of the first piston, and about part 7B so that when this part is engaged in opening 5 the first chamber is isolated from the external environment. A rod 9, of a length greater than that of the two chambers 2, 3, is disposed along the axis of the body and passes through the separation element 4 through an opening 10 formed therein. Seals 11 are disposed in opening 10 around the rod 9 for isolating the two chambers from each other. At the end of chamber 3 opposite the separation element. The rod 9 slides in a central bore 43 of body 51. Seals 44 are disposed in the central bore 43 so as to seal the sliding of the rod 9 and to isolate chamber 3, the part of the central bore 43 above the end of the rod 9. The rod 9 is fixed in the first chamber 2 to the first piston 7 and in the second chamber to a valve 12 whose section is greater than that of the opening 5. The distance between valve 12 and the first piston 7 is preferably chosen so that, when this latter closes up the opening 5 of the first chamber 2, the valve is in contact with the separation element 4.

A recess 13 is formed in the face of the valve opposite the separation element 4 and an annular cavity 14 of a diameter less than that of the valve is formed in the wall. A radial duct 15 causes the annular cavity 14 to communicate with a groove 16 in the inner surface of the body.

The second chamber 3 comprises a first part 3A in which valve 12 moves and a second part 3B having a section less than that of the first part 3A. The two parts 3A, 3B are separated by a shoulder 17. The stroke and section of valve 12 are respectively less than the length and section of this first part of chamber 3A.

A second piston 18 having two parts whose sections are respectively equal to the two parts of the second chamber 3 and having at its periphery annular seals 19 is adapted for sealed sliding in this second chamber 3. The second piston 18 comprises a central bore 20 and a circular seal 21 allowing for tight sliding of rod 9 associated with the first piston 7.

The hydraulic operating system comprises four ducts 22, 23, 24, and 25 parallel to the axis of body 1, which are formed in the outer wall thereof. Ducts 22, 23 respectively emerge at a first end in a vicinity of the base of the second chamber 3 and in the circular groove 16 in the wall of the body. Ducts 24, 25 respectively emerge at a first end in a vicinity of the two opposite ends of the second chamber 3. A duct 26, formed along the axis of rod 9, causes part of chamber 2 between the separation element 4 and the first piston to communicate with the central bore 43.

Discharge means (not shown) comprising, for example, a channel passing through the first piston 7 from one side to the other, associated with a valving means which is actuated mechanically when the first part 7A of the piston comes into contact with the inner wall of plug 6, discharges the volume of high pressure external fluid which may be confined between the inner wall of plug 6 and part 7A of the piston when part 7B thereof seals off the opening 5. Discharge occurs towards the inside of chamber 2 and towards a compartment at atmospheric pressure through the axial channel in rod 9.

Ducts 22, 23, 24 and 25 and the central bore 43 in which rod 9 slides open into a compartment 28 of the body containing elements the detail of which is shown in FIGS. 2 to 5.

Duct 23 is connected at its other end to two-way electro-valves, 29, 30 closed in the rest position. The outlets thereof are respectively connected to the duct 22 and to a duct 32 communicating with a reservoir 31 containing air at a pressure very much lower than the pressure reigning outside the body under normal conditions of use of the device, air at atmospheric pressure, for example. The pressure inside compartment 28 is equal to that existing in reservoir 31.

Duct 24 communicates with the inlet of a two-way electro-valve 33, open in the rest position and, through a non return valve 42, with the output of a hydraulic pump 34 driven by an electric motor (not shown). The input of pump 34 is connected by a duct 35 to the output of the electro-valve 33 and to duct 25. Duct 35 is further connected to the input of a cylinder 36 communicating at one end with the outside of the body and closed by a free piston 37 adapted for maintaining the hydraulic fluid at the input of the pump and the base of the second chamber 3 at a pressure equal to the external pressure. A circuit element comprising a valve 38 adjusted to a given pressure and a non return valve 39 is shunted across pump 34 for limiting the over pressure created during operation thereof. The pump, reservoir 31 and electro-valves 29, 30, 33 form the means for driving the hydraulic control system.

A layer 40 of a shock absorbing material is fixed to the separation element 4, on the first chamber side, for braking the first piston 7 at an end of its stroke.

The electro-valves and the electric motor actuating pump 34 are supplied through electric conductors 41 connected to the conductors included in the cable supporting device in the well.

The above described device for generating acoustic pulses operates as follows.

In a rest position shown in FIG. 2, the pump is stopped and the electro-valve 33 is open. The pressures of the hydraulic fluid at the two ends of the second chamber 3 are equal to the pressure outside the body. Since the surface of the second piston 18 in front of valve 12 is larger than its opposite surface, the force resulting from the application of this pressure to its opposite faces results in maintaining it in the top position. Since the pressure in the volume of the first chamber 2 between the separation element 4 and the first piston 7 is very much lower than the external pressure, the assembly of the first piston and valve 12 is held in the top position.

With the two electro-valves 29, 30 held at rest, the hydraulic pump 34 and the electro-valve 33 are simultaneously actuated so as to close this latter and to establish in the smaller section upper part of the second chamber 3 a pressure greater than the external pressure (FIG. 3).

The second piston 18 moves downwards and is applied against valve 12 which it pushes in its translational movement until it is applied against the separation element 4 and recess 13 of the valve is isolated from the rest of the second chamber 3. The first piston 7 then occupies its first position (low position) in which it closes the opening 5 in body 1.

Then, the electro-valve 30 is caused to open (FIG. 4) an the recess 13 of valve 12 is caused to commuicate with the reservoir at atmospheric pressure 31 through the annular recess 14 in the separation element 4 and ducts 23 and 32. The respective sections of the part 7B of the first piston and of the valve are chosen so that the force which results from application thereto of the pressure difference between the external pressure and the atmospheric pressure is sufficient for holding the first piston against plug 6 in the absence of any additional thrust from the second piston. Then, pump 31 is stopped and the electric power supply for the third electro-valve. 33 is interrupted, this latter coming back to its open position. Since the two opposite sides of the second position 18 are at the same pressure and since their surfaces are unequal, the second piston 18 rises towards the top of the second chamber 3 because of the unequal forces which are applied thereto by the hydraulic fluid, as far as the position shown in FIG. 1.

At the moment chosen for release (FIG. 5), the electric power supply to the second electro-valve 30 is interrupted and the first electro-valve 29 is energized. Communication with reservoir 31 is interrupted and ducts 22 and 23 are again connected together. Since the pressure is equalized on both sides of valve 12, the retaining force ceases and the first piston 7, propelled by the external liquid acting through opening 5, comes suddenly back to its rest position (second position). Under the effect of the implosion, intense seismic pulses are emitted inside the well and transmitted to the surrounding formations.

What is claimed is:

1. A device for generating acoustic pulses by implosion inside a well comprising an elongate rigid body having a section less than that of the well and connected by a cable to a surface installation, said rigid body comprising a first and second coaxial chamber isolated from each other by a fixed separation element, said first chamber having an opening at one end thereof communicatable with a medium external of the rigid body, a first piston adapted for tightly sliding inside said first chamber between a first position and a second position, said piston having a face exposed to pressure outside said rigid body and being secured to a valve adapted form moving in the second chamber and coming into engagement against a seat formed on the separation element, in the first position of said first piston, a second piston adapted for tightly sliding inside the rigid body on a side of the valve opposite said first piston and having a stroke at least equal to that of the first piston between its first and second positions, means for establishing, on one side of the first piston, a pressure very much lower than the external pressure, and a hydraulic control system comprising drive means and hydraulic circuits, disposed inside said rigid body for moving said first piston to its first position, through the second piston pushing the valve onto its seat and for intermittently maintaining the valve against its seat, when the second piston is brought back to the end of the second chamber opposite said separation element, wherein said hydraulic control system comprises means for providing a fluid at a first pressure equal to a hydrostatic pressure prevailing outside the rigid body and pump means for intermittently delivering fluid at a second upper pressure for returning the first piston to the first position, wherein said opening of said first chamber has a section less than that of said first chamber, said first piston comprising a part whose section is adapted to that of said opening and which closes said opening in the first position of said first piston, and the section of the valve is greater than that of said part of said first piston, and wherein said valve is secured to the first piston by a rod passing through said separation element and said second chamber comprises two parts of unequal sections, said second piston comprises two parts of different sections adapted respectively to the sections of the two parts of said second chamber, a largest section end of said second piston being adapted to come into abutment against the valve.

2. The device as claimed in claim 1, comprising a first hydraulic circuit and a first switching means for intermittently establishing an overpressure in the smallest section part of said second chamber and a second hydraulic circuit associated with a switching assembly for causing a recess formed in the seat to communicate intermittently with a reservoir whose pressure is very much lower than that existing in said second chamber, when the valve is engaged on its seat.

3. The device as claimed in claim 2, wherein said pump means comprises a hydraulic pump communicating through said first hydraulic circuit with the smaller section part of said second chamber and with the opposite part thereof through an electro-valve open in its rest position and actuated at the same time as the pump, said switching system comprising two electro-valves closed in their rest position and actuated successively for causing said cavity in said seat to communicate through said second hydraulic circuit respectively with said reservoir and with the larger section part of said second chamber.

4. The device as claimed in claim 2, wherein said first switching means includes an electro-valve which is open in its rest position and which, when electrically actuated, causes the two parts of the second chamber on opposite sides of said second piston to communicate with each other through ducts, the hydraulic fluid at its lowest pressure being maintained at the pressure existing outside the rigid body by a free piston movable in a cylinder open at one end thereof, and wherein said switching assembly comprises two electro-valves closed in their rest position, said recess in said seat being caused to communicate by selective closure of these two electro-valves with the part of said second chamber in a vicinity of the separation element or with said reservoir.

5. The device as claimed in claim 1, wherein a layer of a shock absorbing material is inserted between the first piston and the element separating a two chambers, for braking the movement of said first positiion in a vicinity of its second position.

6. The device as claimed in claim 1, wherein said first piston in its first position closes an opening formed in a part fixed to the open end of said first chamber.

7. The device as claimed in claim 1, wherein said opening of the first chamber is defined by an added part forming a seat for the first piston in its first position, and wherein means are provided for eliminating the overpressures between the piston and said added part in the first position of said first piston.

* * * * *